(12) United States Patent
Yamada et al.

(10) Patent No.: US 7,478,136 B2
(45) Date of Patent: Jan. 13, 2009

(54) TERMINAL AND REPEATER

(75) Inventors: Kazuhiro Yamada, Yokohama (JP); Tatsuaki Wakabayashi, Yokohama (JP); Dai Kamiya, Ichikawa (JP); Yoshiaki Hiramatsu, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 449 days.

(21) Appl. No.: 10/181,837

(22) PCT Filed: Dec. 11, 2001

(86) PCT No.: PCT/JP01/10833

§ 371 (c)(1),
(2), (4) Date: Jul. 19, 2002

(87) PCT Pub. No.: WO02/48869

PCT Pub. Date: Jun. 20, 2002

(65) Prior Publication Data

US 2003/0037105 A1    Feb. 20, 2003

(30) Foreign Application Priority Data

Dec. 11, 2000    (JP) .............................. 2000-376629

(51) Int. Cl.
G06F 15/16    (2006.01)
G06F 3/00     (2006.01)
G06F 3/14     (2006.01)

(52) U.S. Cl. ..................... 709/207; 709/217; 715/749; 715/864

(58) Field of Classification Search ................ 709/203, 709/207, 217; 715/749, 864
See application file for complete search history.

(56) References Cited

U.S. PATENT DOCUMENTS

| 4,136,359 | A | * | 1/1979 | Wozniak ...................... 348/510 |
| 5,548,645 | A | * | 8/1996 | Ananda ........................ 705/52 |
| 5,758,072 | A | * | 5/1998 | Filepp et al. ................. 709/220 |
| 5,923,885 | A | * | 7/1999 | Johnson et al. .............. 717/176 |

(Continued)

FOREIGN PATENT DOCUMENTS

CN    1140642 A    1/1997

(Continued)

OTHER PUBLICATIONS

Kawamura, H., "Introduction to Extensive Use of Internet", *Monthly ASCII. PC, ASCII Corporation*, vol. 3, No. 12, Dec. 1, 2000, pp. 128-131.

(Continued)

*Primary Examiner*—Andrew Caldwell
*Assistant Examiner*—Douglas Blair
(74) *Attorney, Agent, or Firm*—Brinks Hofer Gilson & Lione

(57) ABSTRACT

An application title, storage location information, and a download flag F is stored in an application control table TBL provided in table area 14b of EEPROM 14 of mobile phone MS. The download flag F indicates whether the application is a downloaded application. When downloading an application from IP server W, CPU 11 changes the download flag corresponding to the application to "1". When executing the application, CPU 11 reads out the download flag F corresponding to the application and displays a predetermined image on a liquid crystal display MS4 when the download flag F has a value of "1".

24 Claims, 14 Drawing Sheets

U.S. PATENT DOCUMENTS

| | | | |
|---|---|---|---|
| 5,960,170 A * | 9/1999 | Chen et al. ............... | 714/38 |
| 6,081,533 A * | 6/2000 | Laubach et al. .......... | 370/421 |
| 6,092,194 A | 7/2000 | Touboul | |
| 6,115,040 A * | 9/2000 | Bladow et al. ............ | 715/741 |
| 6,154,844 A | 11/2000 | Touboul et al. | |
| 6,260,187 B1 * | 7/2001 | Cirne ........................ | 717/110 |
| 6,347,398 B1 * | 2/2002 | Parthasarathy et al. ...... | 717/178 |
| 6,683,546 B1 * | 1/2004 | Torrubia-Saez ............ | 341/51 |
| 6,779,042 B1 * | 8/2004 | Kloba et al. ............... | 709/248 |
| 6,941,270 B1 * | 9/2005 | Hannula .................... | 705/1 |
| 6,966,002 B1 * | 11/2005 | Torrubia-Saez ............ | 726/29 |
| 7,024,363 B1 * | 4/2006 | Comerford et al. ......... | 704/270 |
| 7,032,185 B1 * | 4/2006 | Yohanan ..................... | 715/847 |
| 7,263,361 B2 * | 8/2007 | Taylor ........................ | 455/450 |
| 7,299,256 B2 * | 11/2007 | Pradhan et al. ............. | 709/203 |
| 7,346,848 B1 * | 3/2008 | Ruthfield et al. ............ | 715/749 |
| 2001/0054066 A1 * | 12/2001 | Spitzer ....................... | 709/203 |
| 2002/0093923 A1 * | 7/2002 | Bouet ......................... | 370/328 |

FOREIGN PATENT DOCUMENTS

| | | |
|---|---|---|
| EP | 0275510 A2 | 12/1987 |
| EP | 0 737 538 A1 | 10/1996 |
| EP | 0 813 132 A2 | 12/1997 |
| JP | S55-101281 | 8/1980 |
| JP | 61-283929 | 12/1986 |
| JP | H05-150817 | 6/1993 |
| JP | 6-12251 | 1/1994 |
| JP | 9-231067 | 9/1997 |
| JP | H09-269930 A | 10/1997 |
| JP | 11-167487 | 6/1999 |
| WO | WO 99/64946 A1 | 12/1999 |
| WO | WO 0065855 A1 | 11/2000 |

OTHER PUBLICATIONS

Japanese Office Action mailed Feb. 14, 2006.
Canadian Intellectual Property Office Action for application No. 2,397,170 dated Dec. 28, 2006.
Dalheimer et al., "Running Linux, 3rd Edition", XP-002483427, 13 pages, Aug. 1999.
Bailey, "Maximum PRM—Taking the Red Hat Package Manager to the Limit", XP007903923, pp. 1-565, Feb. 2000.
Holmström, "User-centered design of security software", XP-002483426, pp. 1-9, 1999.
Gong et al., "Going Beyond the Sandbox: An Overview of the New Security Archtecture in the Java Development Kit 1.2", XP-002483435, 11 pages, Dec. 1997.
Supplementary European Search Report issued Jun. 24, 2008 in European patent application No. 01270831.9.

* cited by examiner

FIG. 3

| APPLICATION TITLE | STORAGE LOCATION INFORMATION | DOWNLOAD FLAG:F |
|---|---|---|
| APPLICATION a | EEPROM(#1) | 1 |
| APPLICATION b | EEPROM(#3) | 1 |
| ⋮ | ⋮ | ⋮ |

TBL

US 7,478,136 B2

TERMINAL AND REPEATER

TECHNICAL FIELD

The present invention relates to a terminal device that executes an installed application program, and to a relay device that relays data between different networks.

BACKGROUND ART

Various application programs can be installed in a terminal device such as a personal computer, to provide a variety of functionality. Such application programs can be installed by means of storage media such as a CD-ROM, or via a server on a network such as the Internet; alternatively, application programs may be preinstalled by a manufacturer of a terminal, or installed by a retail seller of a terminal who has a license contract with the application program manufacturer.

However, not all sources of application programs can be trusted; malicious individuals may, for example, make available damaging or dangerous software via servers on the Internet.

DISCLOSURE OF INVENTION

The present invention has been made in light of the above problem, and has as its object the provision of a terminal device and a relay device capable of notifying a user of a terminal of differences in sources of application programs executed on the terminal.

To achieve the stated object, the present invention provides a terminal device which has a storage means for storing a plurality of applications; and an application executing means for executing an application stored in the storage means, and for giving a user a notification on the basis of a source of an application being executed.

The application executing means may determine a source of an application on the basis of an installation method of the application.

The application executing means may change the notification on the basis of whether the application being executed is downloaded from a network.

The application executing means may change the notification on the basis of whether the application being executed is read out from an external storage medium.

The application executing means may change the notification on the basis of whether reliability of the application being executed is guaranteed by a third party which is different from a provider of the application.

The application stored in the storage means may include an application downloaded from a network via a relay device, and the application executing means may determine whether reliability of the application is guaranteed on the basis of whether there is a predetermined identifier added by the relay device.

The storage means may have the first storage means for storing an application obtained from external storage medium; and the second storage means for storing a preinstalled application.

The application executing means may change the notification on the basis of whether the application being executed is from the first storage means or from the second storage means.

The terminal device may also have a display means for displaying various information under control of the application executing means. Also, the application executing means may display by image on the display means the notification that differs on the basis of source of application.

The display means may display an image for an application executed by the application executing means on a first displaying area, and an image for the notification information on a second displaying area that is independent from the first displaying area.

Also, according to a method of the present invention for having a terminal device to execute an application: a terminal device downloads an application from a network; the terminal device stores the application in a storage unit in relation to a download identifier showing that the application is a downloaded application; and the terminal device, if a download identifier is related to an application when executing the application, displays a predetermined image on a display of the terminal device.

According to a method of the present invention for having a terminal device to execute an application: the terminal device downloads an application from a network through a relay server; and the terminal device, if the terminal device finds an identifier attached by a relay server on the application when executing the application, displays a predetermined image on a display of the terminal device.

Also, the present invention provides a program product for having a computer to perform processes of: downloading an application from a network by using a communication unit; storing the application in a storage unit in relation to a download identifier showing that the application is a downloaded application; and displaying a predetermined image on a display of the terminal device, if a download identifier is related to the application when the application is being executed.

Further, the present invention provides a computer-readable medium for storing a program for having a computer perform processes of: downloading an application from a network by using a communication unit; storing the application in a storage unit in relation to a download identifier showing the application is a downloaded application; and displaying a predetermined image on a display of the terminal device, if a download identifier is related to the application when the application is being executed.

The present invention also provides a relay device for relaying data between a first network and a second network, the relay device comprising: a receiving means for receiving data from the first network; and a forwarding means for forwarding data received by the receiving means to the second network, and for adding a predetermined identifier to the data when reliability of the data is not assured by a third authority that is different from the source of the data.

Data received by the receiving means from the first network may be sent by a server connected to the first network; and the forwarding means may determine whether reliability of the data is assured on the basis of identification of the server that sends the data received by the receiving means.

The source of an application is determined on the basis of the installation embodiment, that is how the application is installed. As installation embodiments, there are, for example, a method of installing from a storage medium, and a method of installing after downloading from a network.

BRIEF DESCRIPTION OF THE DRAWINGS

FIG. 3 is a diagram showing an example of an application control table TBL of the embodiment.

BEST MODE FOR CARRYING OUT THE INVENTION

Preferred embodiments of the present invention will now be described below referring to the accompanying drawings. In the following description, the subject matter of the embodiment relates to an application written in a non-volatile memory, and a term "application", as used below, precludes a file (for example, applet or GIF file) designated by a tag in data of Hypertext Markup Language type (hereafter, "HTML data"), executed on a browser.

[1] First Embodiment

Figure 1:
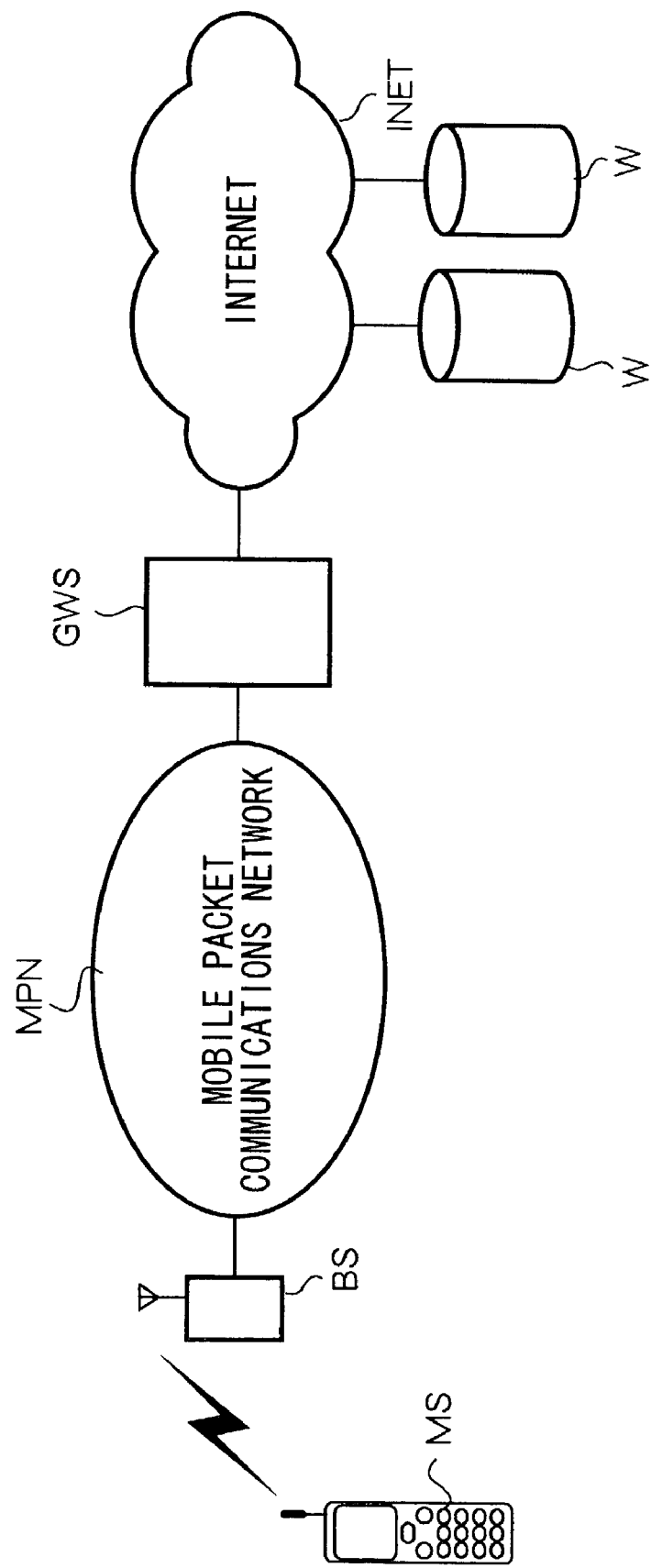
FIG. 1 is a block diagram showing elements used when a mobile phone MS according to the first embodiment downloads an application.

FIG. 1 shows elements used by a mobile phone MS when downloading an application from a server on the Internet, according to the present embodiment. Although a mobile phone MS is used in the present embodiment, a terminal device such as a PDA can also be used in the present invention.

Referring to FIG. 1, description will now be given with respect to elements through which the mobile phone MS downloads an application from IP server W via the Internet.

An application stored in IP server W is transmitted to a mobile phone MS through the Internet INET, a gateway server GWS, and a mobile packet communications network MPN. It is to be noted that in FIG. 1, to prevent the drawing from being overly complex, only one mobile phone MS, one base station BS, and two IP servers W are respectively shown. In actuality, however, several mobile phones MS, base stations BS, and IP servers W exist in the network.

IP server W is a computer system owned by Information Provider (IP). The IP server W, for example, holds HTML data, a software called Java application written in Java™ programming language and various applications written in other programming languages (hereafter, the term application is used generically to refer to Java and other applications, unless otherwise stated). Applications held in the IP server W include, for example, an application for performing online trading such as stock trading, an address book application, and Personal Information manager application (PIM). Each application is stored differently, depending on its type. For example, a Java application is divided into ADF having attributes such as a name of the application, and Jar containing a data body of the application; and ADF and Jar are held in IP server W. In the following explanation, unless there is a specific need to distinguish ADF from Jar, they will each be referred to as a Java application. Applications other than Java applications are stored without being divided.

A URL is set for each one of data including these applications. IP server W extracts URL included in the GET request, received from the Internet INET, and sends the data designated by the URL to the Internet INET in response to the request. If the URL included in the GET request, received by IP server W, designates an application other than a Java application, IP server W simply sends back the designated application body to the Internet. However, if the URL designates a Java application, IP server W sends ADF of Java application designated by the URL to the Internet. Then, if a delivery request of Jar correlating to the sent ADF is received, IP server sends the Jar corresponding to the delivery request.

Mobile phone MS can conduct data communication via a mobile packet communication network MPN. In addition, mobile phone MS can conduct voice communication via a mobile telephone network (not shown). Mobile phone MS stores a World Wide Web (WWW) browser, which a user of mobile phone MS uses to browse pages provided via IP server W. WWW browser provided in mobile station MS also functions to execute Java applets. When browsing a WWW page, a WWW browser can download a Java applet designated by a tag and execute the downloaded Java applet. Besides, mobile phone MS is able to execute various applications such as a Java application downloaded from IP server W.

In addition, according to the present embodiment, the mobile phone MS treats an application differently depending on its source. More specifically, mobile phone MS is able to notify a user that an application, when it is executed, has been downloaded. The specific configuration for realizing this function will be explained in detail later.

Mobile packet communications network MPN is a communication network for providing a packet communication service to mobile station MS, and has a packet subscriber processing device (not shown) in addition to gateway server GWS and a plurality of base stations.

Gateway server GWS is a computer system provided in a mobile packet gateway switching center that connects the mobile packet communications network to the Internet INET. The gateway server GWS executes protocol conversion on the received data so as to be conformed with the destination network and then transmits the converted data. Data communications between mobile packet communication network MPN and the Internet INET in the present embodiment is realized by the function of gateway server GWS.

(A) Hardware Configuration of Mobile Phone MS

Figure 2:
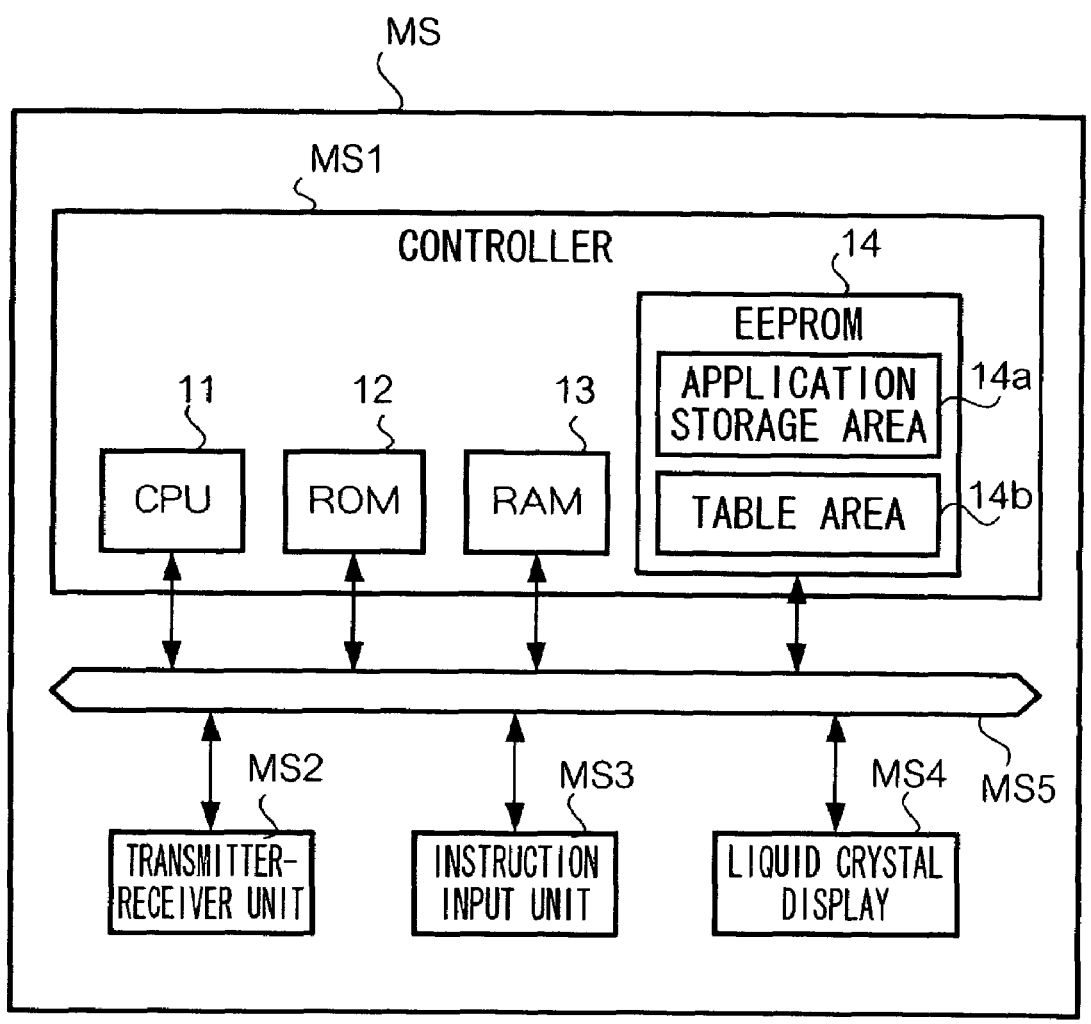
FIG. 2 is a block diagram showing a configuration of the mobile phone MS according to the embodiment.

FIG. 2 is a block diagram showing a configuration of the mobile phone MS according to the present embodiment.

As shown in the figure, mobile phone MS has a controller MS1, a transmitter-receiver part MS2, an instruction input part MS3, a liquid crystal display MS4, and a bus MS5 used for data transmission between each element.

Transmitter-receiver part MS2, under the control of controller MS1, performs wireless communication with base station BS of mobile packet communications network MPN.

Instruction input part MS3 is provided with a variety of buttons such as push button (PB), and also with cursor keys. When a user performs an input operation, instruction input part MS3 sends an operation signal in response to the input operation to controller MS1. Liquid crystal display MS4 is comprised of a display device such as liquid crystal panel, and displays various information under the control of controller MS1.

Controller MS1 comprises, for example, a Central Processing Unit (CPU) 11, a Read Only Memory (ROM) 12, a Random Access Memory (RAM) 13 and a EEPROM 14, and controls each part of mobile phone MS. ROM 12 stores various applications such as a WWW browser, and a control application. The application stored in ROM 12 is an application stored in a production process of the mobile phone MS (pre-installed), and reliability of the application is assured by a mobile communication carrier or maker of mobile phone MS. In the following explanation, the application preinstalled in the ROM 12 is referred to as a preinstalled application.

RAM 13 is used as a work area of CPU 11 and temporarily stores data such as HTML data and applications downloaded from IP server W.

EEPROM 14 has an application storage area 14a and a table area 14b. In application storage area 14a, applications downloaded from IP server W are stored. In the following explanation, applications downloaded from IP server W to be stored in application storage area 14a of EEPROM 14 are referred to as download applications.

As shown in FIG. 3, in table storage area 14b, application control table TBL is provided. As shown, storage location information of the application (storage medium name or memory address), and download flag F is stored in application control table TBL in relation with every application name stored in mobile phone MS (that is, the preinstalled application or downloaded application).

Download flag F is a flag which indicates whether an application is a downloaded application. If an application is a downloaded one, flag F has a value of "1"; if the application is a preinstalled one, the flag has a value of "0".

In the present embodiment, CPU 11, at the time of executing an application stored in ROM 12 and EEPROM 14, treats the executed application differently on the basis of the contents of application control table TBL. More specifically, CPU 11 reads out download flag F from the application control table TBL at the time of executing an application, and in the case that the download flag has a value of "1", CPU 11 sends a control signal to liquid crystal display MS4. Upon receipt of the signal, a predetermined image is displayed on liquid crystal display MS4. Thus, according to the present embodiment, the mobile phone MS is able to notify a user that an application being executed by CPU 11 is a downloaded application.

Figure 4A:
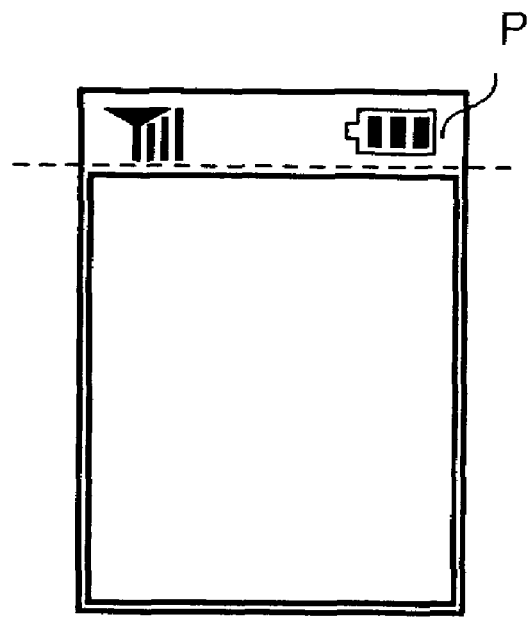
FIG. 4A is a diagram showing an example of a display of a liquid crystal display MS4 during execution of a preinstalled application.
Figure 4B:
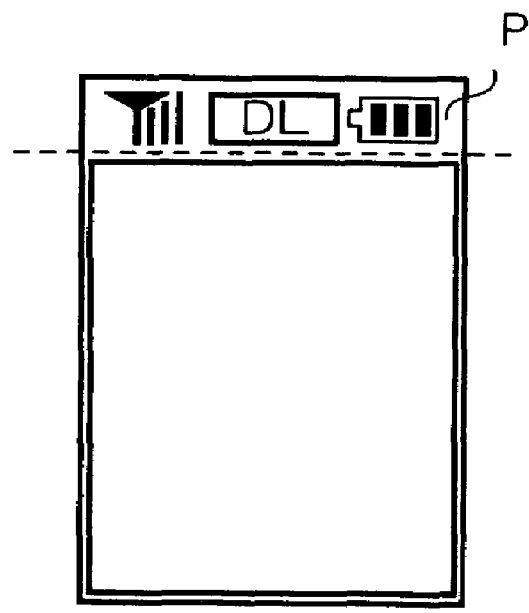
FIG. 4B is a diagram showing an example of the display of liquid crystal display MS4 during execution of a downloaded application.

FIG. 4A shows an example of a display in liquid crystal display MS4 when executing a preinstalled application, and FIG. 4B shows an example of a display in liquid crystal display MS4 when executing a downloaded application. As will be apparent from FIG. 4A and FIG. 4B, a symbol showing "DL" is displayed in FIG. 4B (hereafter, the image is referred to as "DL" mark). Thus, when the application being executed is a download application, "DL" is displayed.

Furthermore, the display screen shown in FIG. 4a and FIG. 4B is divided into two areas. That is, in the figure, in an area below the dotted line a runtime screen of an application being executed is displayed; and in an area P above the dotted line icons which are typically used in a mobile phone, such as an antenna symbol, are displayed (hereafter, these icons are referred to as "pictogram". "DL" is also a pictogram). Note that the area P is not used by any application, and is independent from other area.

When "DL" is displayed in area P, it can be determined that an application being executed is a downloaded application.

(B) Application Runtime Environment of Mobile Phone

Figure 5:
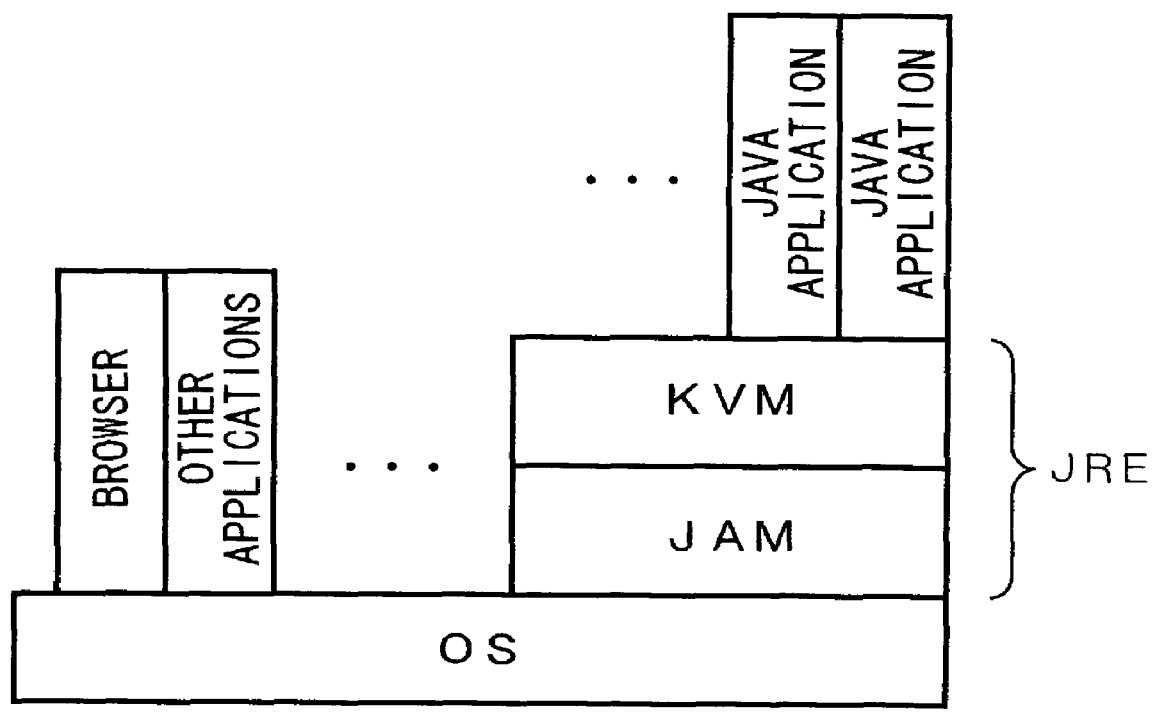
FIG. 5 is a schematic diagram showing an execution environment of an application in the mobile phone MS according to the first embodiment.

FIG. 5 is a schematic diagram showing a runtime environment of an application in mobile phone MS.

In the present embodiment, the application execution environment of mobile phone MS includes a Java runtime environment (hereafter, referred to as "Java Runtime Environment" (JRE)) on an operating system (hereafter, referred to as "OS") provided in the lowest layer.

JRE is comprised of a Java application manager (hereafter, abbreviated as "JAM") and Java virtual machine (hereafter, abbreviated as "KVM"), and both are executed under OS functionality. A Java application is executed by CPU 11 on the basis of a runtime environment that JRE provides. JAM is software for controlling security in executing a Java application. KVM is software for executing, under control of JAM, a Java application; and it functions to convert bytecode, execution file type of Java, into mandate code recognizable by CPU 11 of mobile phone MS.

Applications other than Java applications (for example, WWW a browser and so forth) are executed by CPU 11 under OS functionality.

[1.2] Operation of First Embodiment

Hereafter, operations of the present embodiment will be explained in the following order (A) operation when downloading an application (B) operation when executing an application in mobile phone MS.

(A) Operation when Downloading an Application

Figure 6:
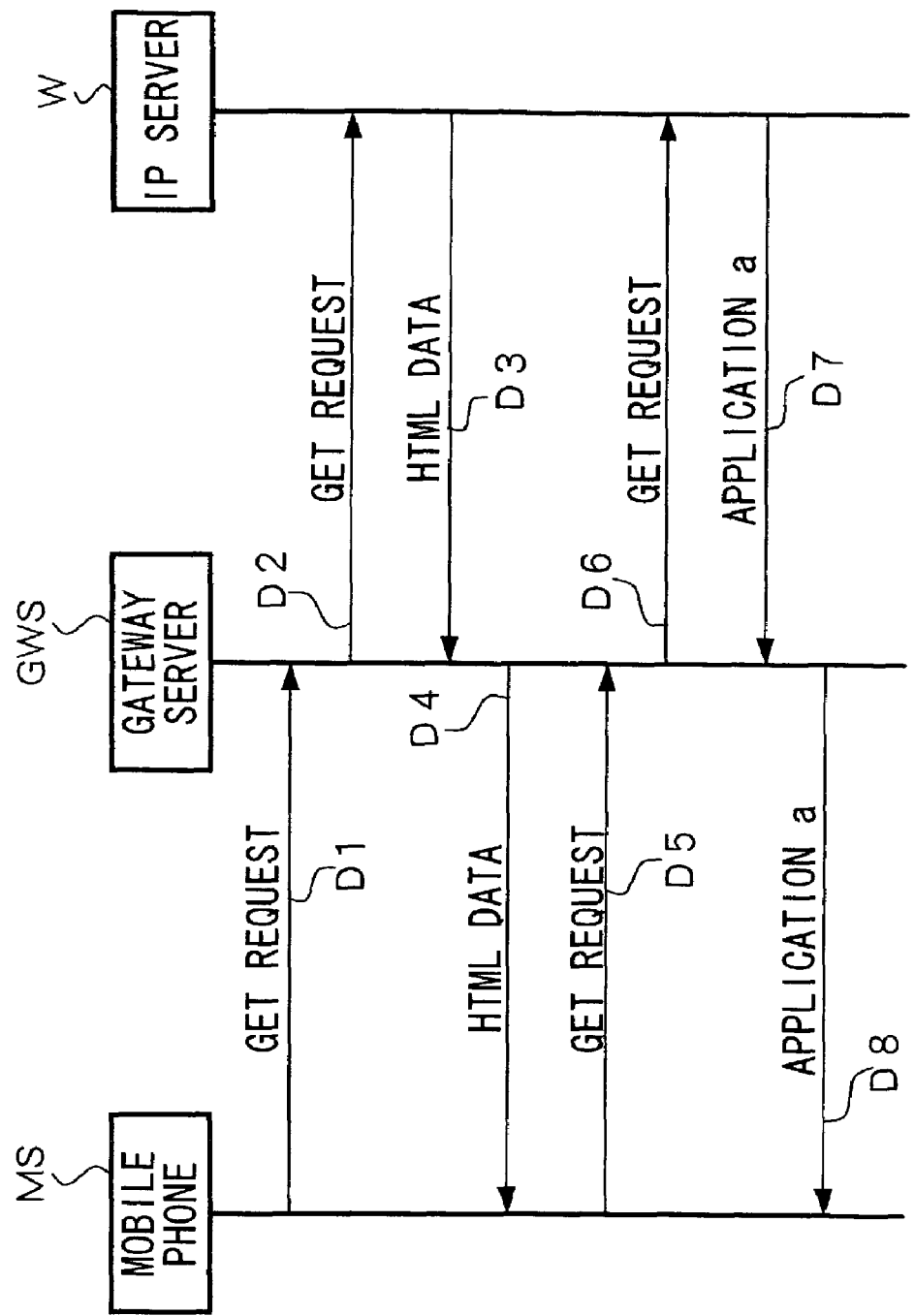
FIG. 6 is a diagram showing a data sequence when the mobile phone MS according to the first embodiment downloads an application through gateway server GWS.

An operation of downloading an application will now be explained below with reference to the data sequence shown in FIG. 6.

Firstly, a user operates instruction input unit MS3 of mobile phone MS so as to activate WWW browser. After the input, in response to an operation signal sent from instruction input unit MS3, CPU 11 reads out WWW browser from ROM 12, and carries out a packet registration on a packet subscriber processing device which is inside mobile packet communication network MPN described above. The packet registration is a registration procedure for packet switching between mobile phone MS and mobile packet communication network MPN. When packet registration is carried out, mobile phone MS can conduct packet switching between gateway server GWS, which enables mobile phone MS to send a request or response during packet switching.

Thereafter, when the user performs, for example, an input operation designating a URL that identifies the download page of IP server W, CPU 11 in mobile phone MS transmits a GET request D1, including the URL, to mobile packet communications network MPN through transmitter-receiver part MS2. The GET request D1 is then received by gateway server GWS, and the gateway server executes protocol conversion on the request received and transmits it to the Internet INET as GET request D2.

IP server W, upon receiving the GET request D2, sends HTML data D3 designated by the URL included in the GET demand D2 (in this case, a download page) to the Internet INET. HTML data D3 is received by Gateway server GWS and is transmitted to the Internet INET as HTML data D4.

The HTML data D4 is then received by transmitter-receiver unit MS2 of mobile phone MS. CPU 11 of mobile phone MS stores received HTML data D4 in RAM 13, and displays on liquid crystal display MS4 a screen showing the HTML data D4.

Figure 7:
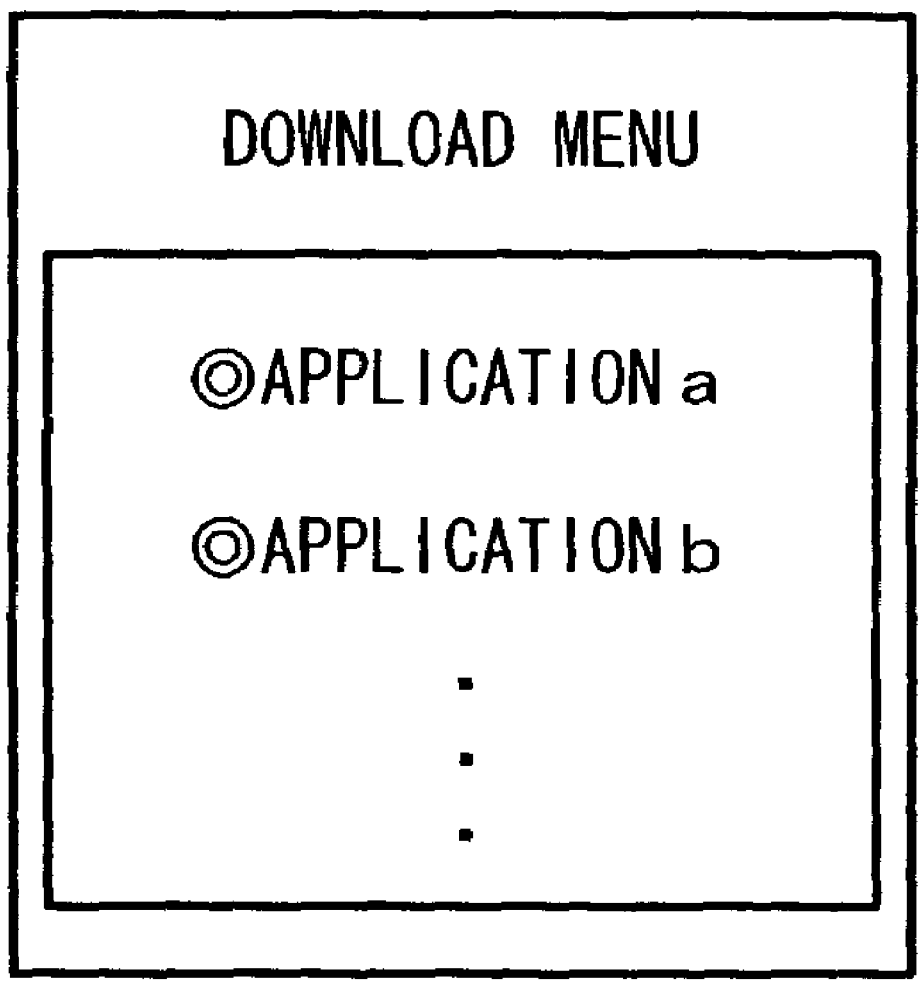
FIG. 7 is a diagram showing an example of display of liquid crystal display 14 in the first embodiment.

FIG. 7 is a diagram showing an example of an image displayed on liquid crystal display MS4 of mobile phone MS that has received HTML data D4. As shown in the figure, an application title that mobile phone MS can download from IP server W is displayed on liquid crystal display MS4 of mobile phone MS as a menu title. Specifically, in FIG. 7, download menus and several application titles are displayed on the liquid crystal display. These application titles are written in the form of anchor tag in HTML data.

At this stage, if a user wants to download "application (a)", the following operation is performed. In the operation, using cursor keys a user first selects an application title. Next, CPU 11 highlights a character string of the selected application title. In the case shown in FIG. 7, the term "character string" referred to as "application (a)" is highlighted, and when the user holds down a predetermined button of instruction input unit M3, during this high-lighted state, CPU 11 transmits GET request D5 including a URL that which designates a menu title "application (a)" to mobile packet communications network MPN through transmitter-receiver unit MS2. At this time, CPU 11 stores the character string of the designated application title (that is, "application (a)") in RAM13.

GET request D5 sent from mobile phone MS is received by gateway server GWS and is transmitted to the Internet INET as GET request D6 to be received by IP server W. IP server W extracts the URL included in the received GET request D6. IP server W sends the application designated by the URL (in this case, application (a)) as data D7 to the Internet INET. Data D7 is subjected to protocol conversion by gateway server GWS, and is then received by mobile phone MS as data D8.

In the present embodiment, a different process is performed depending on whether the application to be downloaded (that is, application (a)) is a Java application or not. The following description will be given in two-part form: when application (a) is a Java application; and when application (a) is another type of application.

(i) When Application (a) is a Java Application

When IP server W receives the GET request D6 sent by mobile phone MS and transmitted through gateway server GWS, IP server W extracts a URL that is included in the GET request. Then, IP server W sends ADF corresponding to the URL (in this case, ADF correlating to application (a) to the Internet INET. The ADF is received by gateway server GWS, and is transmitted to mobile packet communications network MPN.

When a transmitter-receiver unit MS2 of mobile phone MS receives the ADF, CPU 11 of mobile station MS extracts an application title "application (a)" included in the ADF, and stores it in application control table TBL. Then, CPU 11 stores the received ADF in application storage area 14*a* of EEPROM14, and CPU 11 stores the storage location of the ADF (that is, storage medium title (EEPROM14) and memory address) in RAM 13.

Next, CPU 11 sends a distribution request of Jar corresponding to the received ADF (that is, Jar of application a) to the mobile packet communications network MPN. Gateway server GWS transmits the distribution request of Jar, and IP server W receives it. IP server W sends Jar corresponding to the distribution request (that is, Jar corresponding to application (a)) to CPU 11 in response to the request.

When transrmitter-receiver unit MS2 of mobile phone MS receives the Jar, a process as outlined in the following steps is performed by CPU 11.

Step1

CPU 11 stores Jar of the application (a) in the application storage area 14*a* of EEPROM 14. When storing the received application (a), CPU 11 reads out a storage location of ADF stored in RAM 13 and correlates it with the Jar.

Next, CPU 11 stores storage location information of application (a) (that is, storage location of ADF and Jar corresponding to application (a)) in application control table TBL. At this time, type of storage medium (EEPROM 14) and a memory address are stored as the storage location information in the application control table.

Step3

CPU 11 stores download flag F in application control table TBL. In this case, since application (a) is downloaded from IP server W, CPU 11 stores "1" as download flag F in application control table TBL.

Step4

CPU 11 displays a message such as, for example, "download completed" on liquid crystal display MS4, and ends the process.

(ii) When Application (a) is not a Java Application

IP server W that receives GET request D6, sent from mobile phone MS and transmitted through gateway server GWS, extracts a URL included in the GET request and sends the application designated by the URL (that is, application (a)) to the Internet INET as data D7. When the data D7 is transmitted through the gateway server as data D8 and transmitter-receiver unit MS2 of mobile phone MS receives it, CPU 11 of the mobile phone performs the following process.

Step1

CPU 11 reads out character string "application (a)" stored in RAM 13, and stores it in application control table TBL as an application title.

Step2

CPU 11 stores the received application (a) in application storage area 14*a* of EEPROM14.

Step3

Next, CPU 11 stores storage location information of application (a) in application control table TBL. At this time, type of storage medium (EEPROM14) and a memory address are stored as the storage location information in the application control table.

Step4

CPU 11 stores download flag F in application control table TBL. In this case, since application (a) is downloaded from IP server W, CPU 11 stores "1" as download flag F in application control table TBL.

Step5

CPU 11 displays a message such as, for example, "download completed" on liquid crystal display MS4, and ends the process.

(B) Operation when an Application is Executed on Mobile Phone MS

Figure 8:
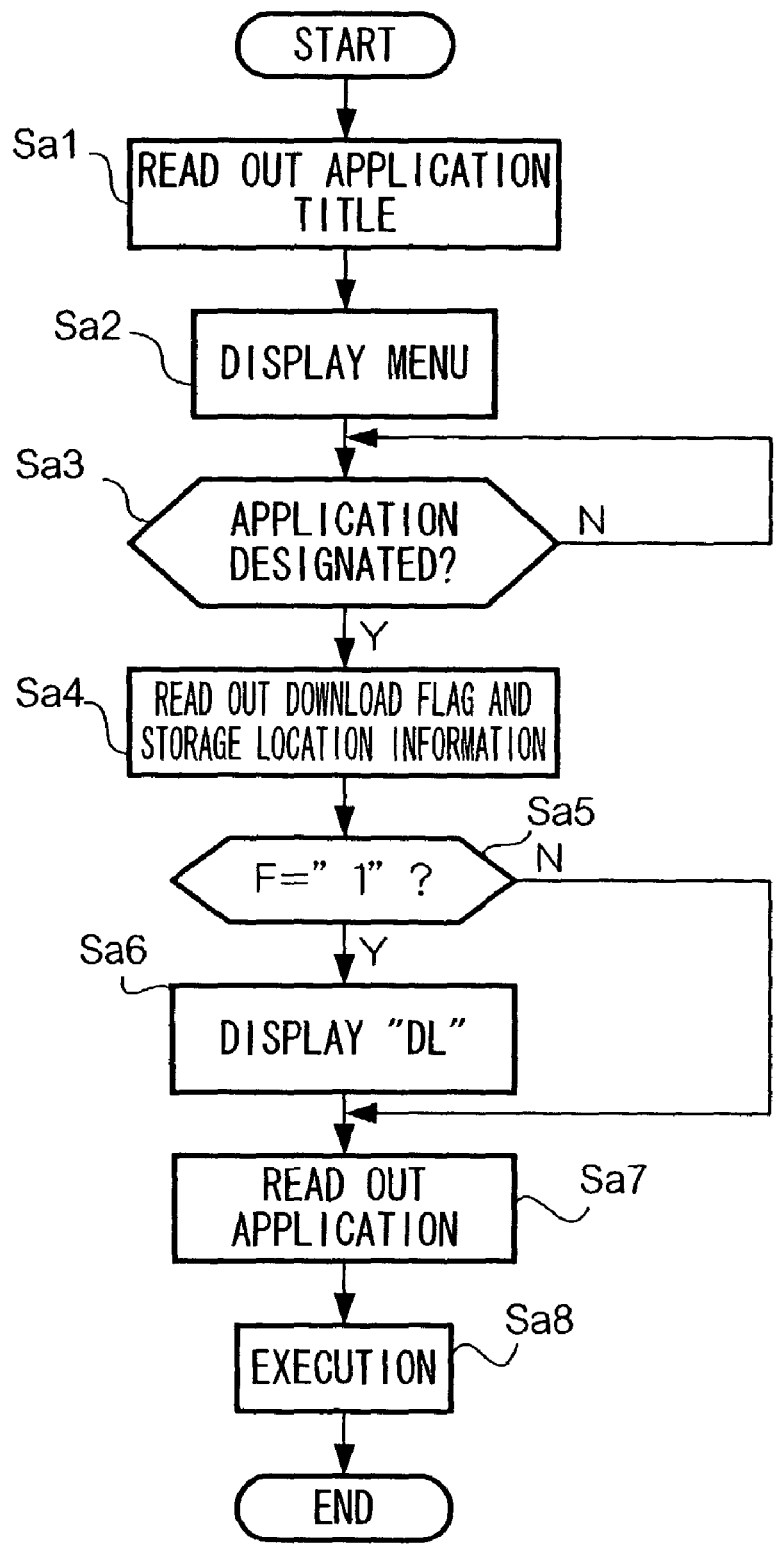
FIG. 8 is a flowchart showing a process performed at the time of executing an application in CPU 11 of the mobile phone MS according to the first embodiment.

An operation when an application is executed on mobile phone MS will now be explained with reference to FIG. 8. In the following explanation, application control table TBL of EEPROM 14 is assumed to be comprised of the same contents as the application control table shown in FIG. 3.

When a user operates a predetermined button of instruction input unit MS3, CPU 11 of mobile phone MS reads out all application titles stored in application control table TBL. CPU 11 then transmits a display control signal to liquid crystal display MS4 to display the application title (step Sa1, Sa2). When liquid crystal display MS4 receives the signal it displays a menu corresponding to each application title.

When a menu is displayed on liquid crystal display MS4, CPU 11 remains in standby mode until a user inputs an instruction input unit MS3 for prompt execution of the application (step Sa3).

When a user inputs application title "application (a)" to start application (a) for example, CPU 11 reads out storage location information "EEPROM (#1)" and download flag F "1", each corresponding to application title "application (a)", from application control table TBL (step Sa4).

After the read out ends, CPU 11 can determine whether the read-out download flag F has a value of "1" (step Sa5). In the case described above, download flag F corresponding to application title "application (a)" has a value of "1". Therefore, the determination in step Sa5 is "Yes". Upon making this determination, CPU 11 performs a process to display "DL" in area P of liquid crystal display MS4 (step Sa6), and CPU 11 reads out the application (a) that the user designated (when application (a) is a Java application, ADF or Jar) according to the storage location information "EEPROM (#1)" (step Sa7).

When the determination in step Sa5 is "No" (that is, when a download flag F has a value of "0"), CPU 11 reads out the designated application and does not have liquid crystal display MS4 to display anything on area P (step Sa7).

In this way, CPU 11 executes an application (a) under a condition appropriate for the application (step Sa8). More specifically, when an application (a) is a Java application, CPU 11 executes it on the basis of the function provided by JRE; whereas, when an application (a) is an application other than a Java application, CPU 11 executes the application (a) on the basis of the under OS functionality.

As described above, when the mobile phone according to the present embodiment executes a downloaded application, "DL" is displayed on liquid crystal display, thereby alerting a user of the phone to a potential problem of reliability of the downloaded application.

Note that, in the present embodiment, the area where the "DL" mark is displayed on the liquid crystal display is independent from an area where application uses, therefore the area is not occupied when an application is executed. Hence, regardless of a type or function of an application executed on the mobile phone, it is possible to notify a user that downloaded-application is in progress.

In the present embodiment, execution of a downloaded application is notified to a user by displaying a pictogram on area P, but it may also be shown in another area. Alternatively, notification may be conveyed to a user by another means, such as audibly.

Furthermore, pictograms displayed on liquid crystal display MS4 may be other than "DL" such as symbols and pictographs.

In the present embodiment, mobile phone MS is provided with an application from IP server W. However, Personal Handyphone System (PHS), telephone, Personal Digital Assistants (PDA), personal computers and the like can also be employed.

When using a terminal such as personal computer, it is possible to display a pictogram on a task-bar provided in a multi-task OS.

Figure 12A:
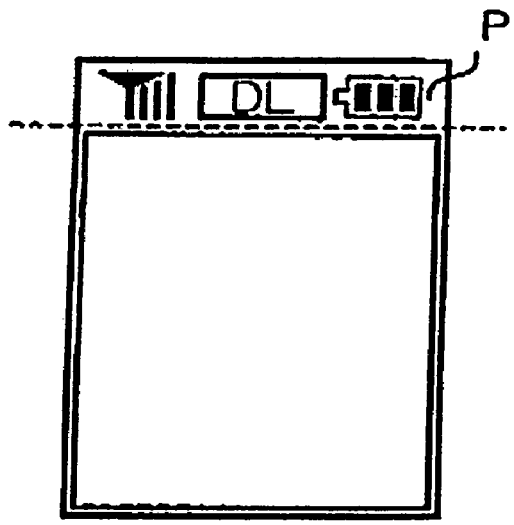
FIG. 12A is a diagram showing an example of a screen of liquid crystal display MS4 during execution of a preinstalled application.
Figure 12B:
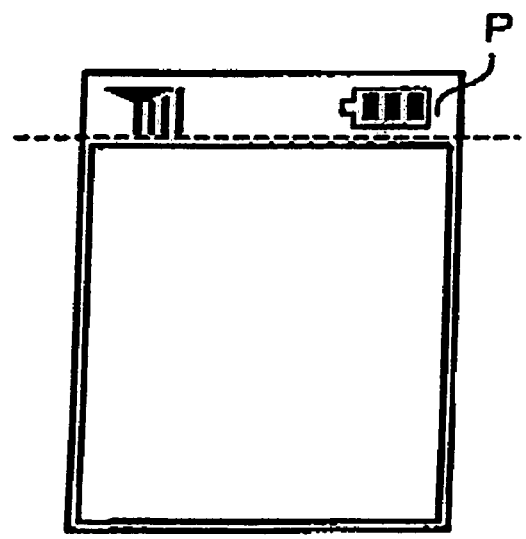
FIG. 12B is a diagram showing an example of a screen of liquid crystal display MS4 during execution of a downloaded application, according to a modified example of the first embodiment.
Figure 13:
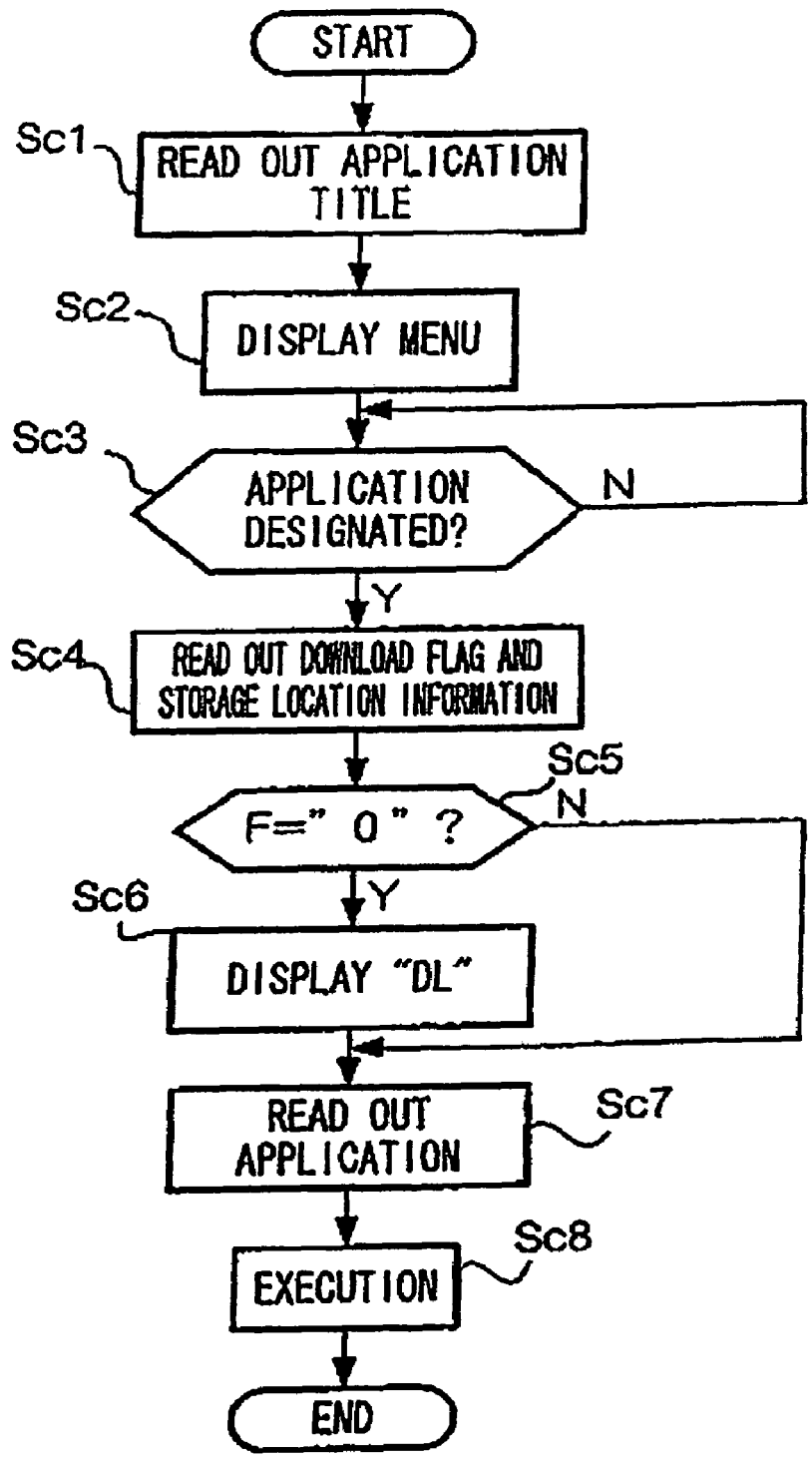
FIG. 13 is a flowchart showing a process performed at the time of executing an application in CPU 11 of the mobile phone MS according to a modified example of the first embodiment.

In the present embodiment pictogram ("DL" symbol) is displayed when an application being executed in mobile phone MS is a downloaded application. However, it is possible to display a pictogram when an application to be executed is a preinstalled application, and not to display any pictogram when executing a downloaded application. FIG. 12A shows an example of a screen displayed in liquid crystal display MS4 when executing a preinstalled application, and FIG. 12B shows an example of a screen displayed in liquid crystal display MS4 when executing a downloaded application, in the modified example of the first embodiment. FIG. 13 shows a process performed at the mobile phone MS in the modified example.

[1.3] Modifications

<Modification 1-1>

In the present embodiment, CPU 11 determines whether the application is downloaded application on the basis of download flag F stored in application control table TBL. However, determining whether the application is a downloaded application or a preinstalled application by another method is possible.

For example, a configuration such as in the following could be used.

As described above, a preinstalled application is stored in ROM 12 of a mobile phone MS at the time of factory shipping, and then shipped. On the other hand, a download application is stored in EEPROM 14. Therefore, the preinstalled application and download application are stored in physically different storage media respectively. Hence, it is possible for CPU 11 to determine whether the application to execute is a downloaded application or a preinstalled application on the basis of a physical difference in storage medium (that is, whether it is "ROM 12" or "EEPROM 14").

More specifically, since storage location information is stored in application control table TBL of EEPROM, whether the application is a downloaded application or a preinstalled application is determined on the basis of storage location information. Thus, download flag F on application control table TBL is not needed.

Figure 9:
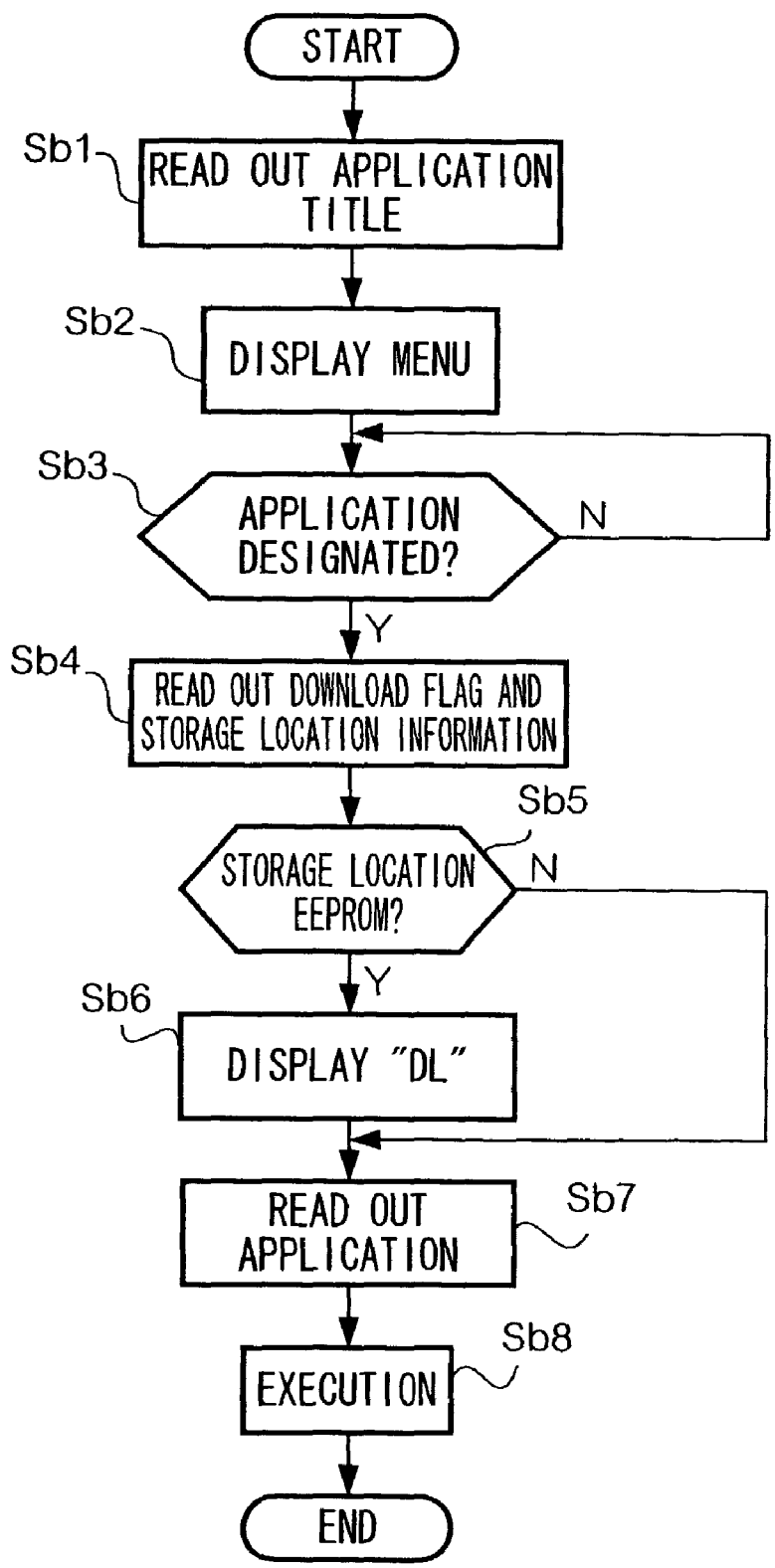
FIG. 9 is a flowchart showing a process performed at the time of executing an application in CPU 11 of the mobile phone MS according to modification 1.

FIG. 9 is a figure showing a process of CPU 11 adopting modification described above. Since the process in FIG. 9 is the same as the process in FIG. 8, as far as step Sb3, explanation before step Sb3 will be omitted. CPU 11 determines whether the storage medium title of the storage location information read out in step Sb4 is "EEPROM" (step Sb5). When the storage medium title is "EEPROM," CPU 11 displays "DL" on liquid crystal display MS4 (step Sb6). When the storage medium title is other than "EEPROM" (in this sample, when it is ROM 12), "DL" is not displayed on liquid crystal display MS4.

Figure 14:
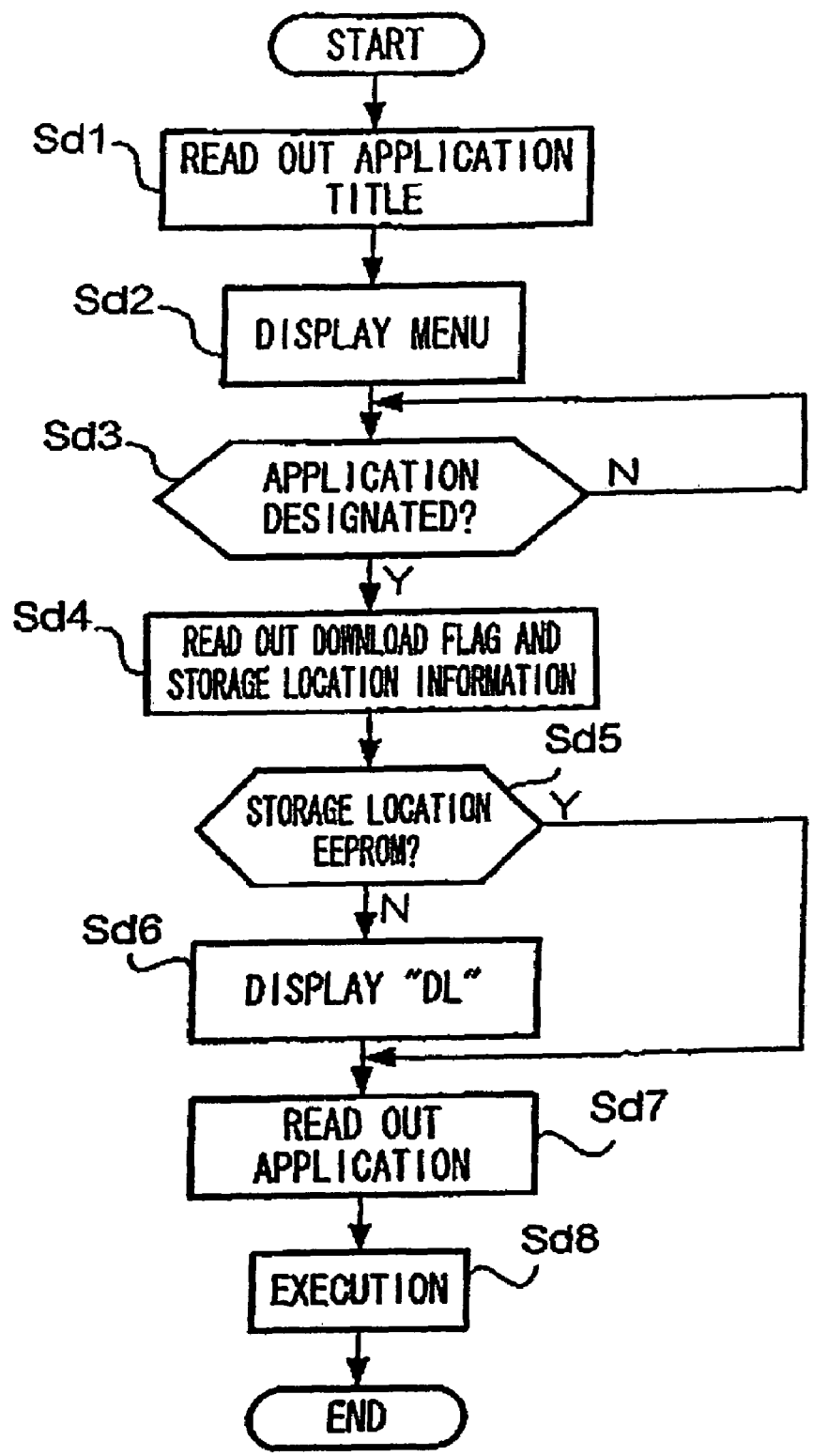
FIG. 14 is a flowchart showing a process performed at the time of executing an application in CPU 11 of the mobile phone MS according to a modified example of modification 1.

Also, a pictogram ("DL symbol) may be displayed when an application stored in ROM12 is running. FIG. 14 shows a process performed at the mobile phone MS in the modified example.

<Modification 1-2>

Figure 10:
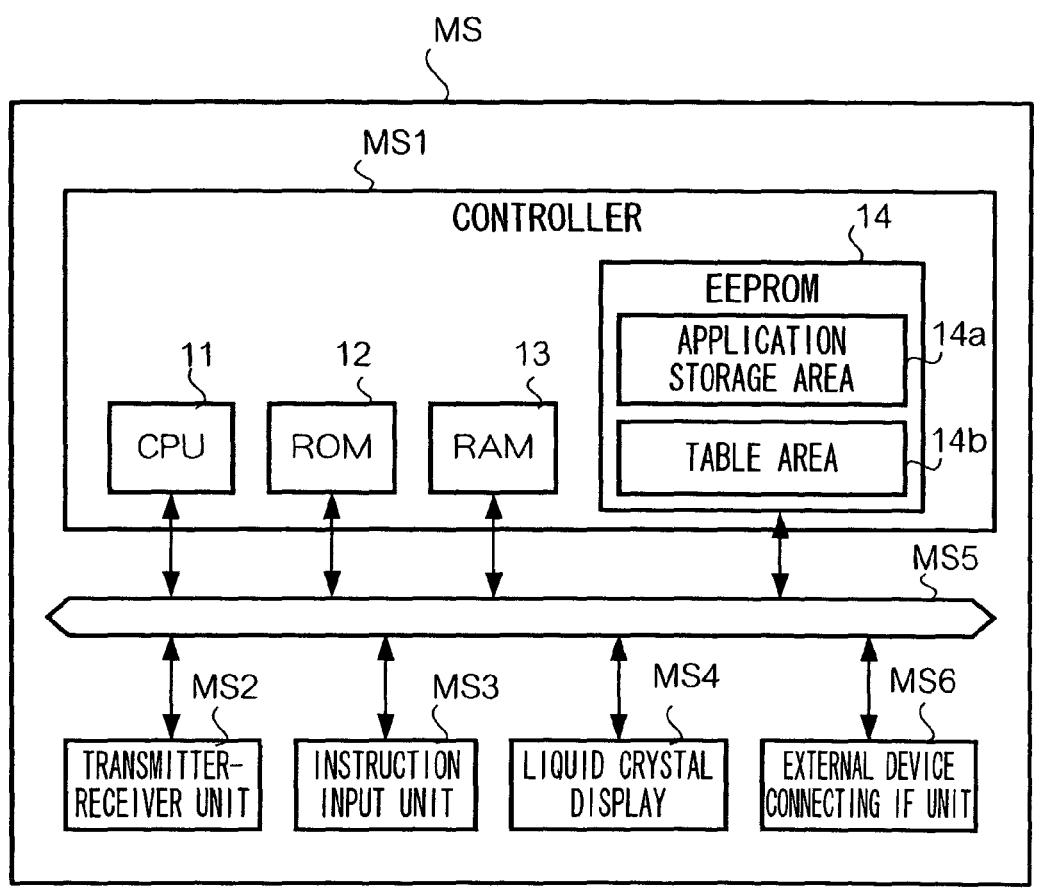
FIG. 10 is a block diagram showing a configuration of the mobile phone MS according to modification 2.

FIG. 10 is a diagram showing the configuration of mobile phone MS10 according to the present modification. Like elements are denoted by the same reference numerals used in FIG. 2.

In mobile phone MS10 according to the present modification, unlike the mobile phone MS shown in FIG. 2, mobile phone MS in the present modification has an external device connecting interface MS6 for connecting an external device such as a CD-ROM drive to relay data. Further, mobile phone MS 10 can be provided with an application from an external device that is connected to external device interface unit MS6, and stores the applications in EEPROM 14.

Further, in the present modification, download flag F is not stored in application control table TBL, and install flag F2 is stored in its place. The flag F2 indicates whether an application is installed from an external device.

When installing an application from an external device, CPU 11 operates so that the install flag F has a value of "1" and stores the flag in application control table TBL. Then, when executing the application, CPU 11 displays "DL" mark on liquid crystal display MS4 when install flag F has a value of "1". Note that, since the process of displaying a "DL" mark is the same as the process in FIG. 8, explanation is omitted.

As described, according to the present modification, not only when executing an application downloaded from network but also when installing an application from an external device, it is possible to notify a user that the application being executed is incorporated from a different source.

In the present modification, mobile phone MS is designed to display a pictogram ("DL" mark) when an application being executed in mobile phone MS is installed from an external storage medium. However, a pictogram may be displayed when the application being executed is a preinstalled application.

[2] Second Embodiment

In the first embodiment, the display of a pictogram is determined on the basis of whether it is a downloaded application or a preinstalled application. However, among downloaded applications there are still applications that may not be safe. For this reason, it is possible to determine whether to display a pictogram by distinguishing a downloaded application from a safe one, and one for which may not be safe.

Figure 11:
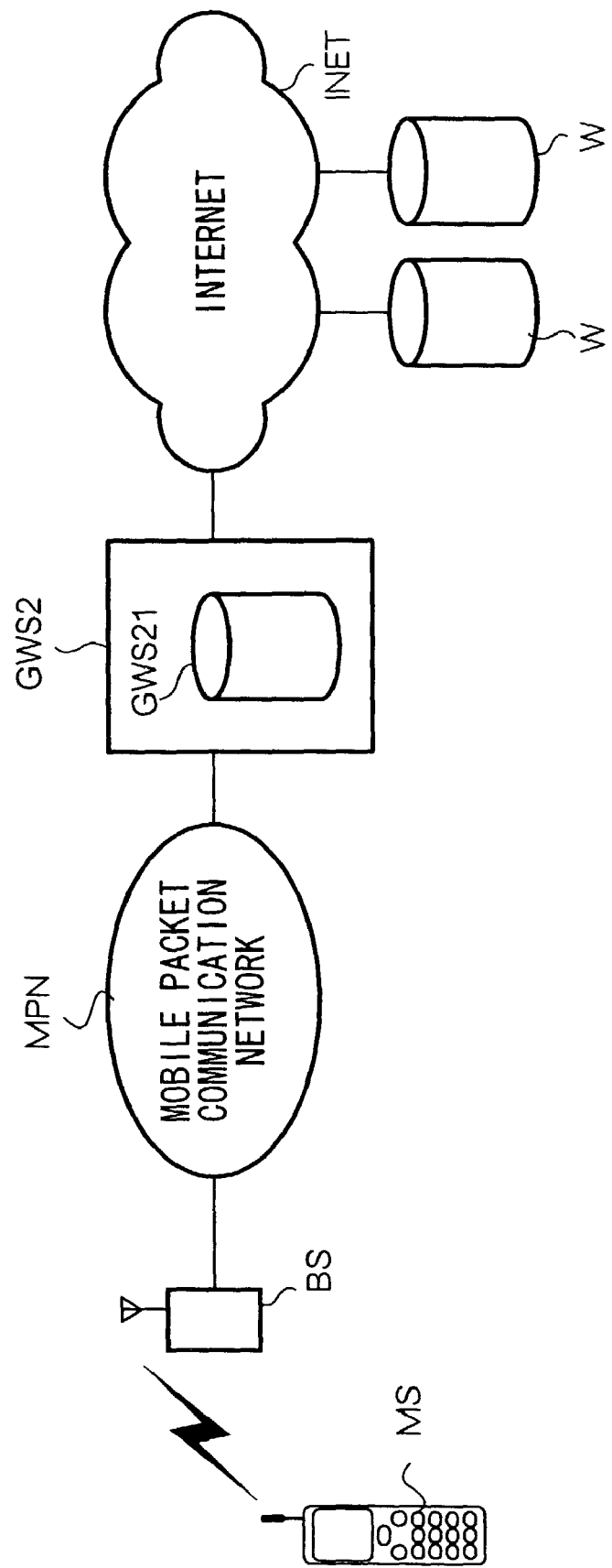
FIG. 11 is a block diagram showing elements used when the mobile phone MS according to the second embodiment downloads an application.

In the second embodiment, as shown in FIG. 11, gateway server GWS2 is used to enable discrimination as described such as above. Like elements are denoted by the same reference numerals used in FIG. 11.

The gateway server GWS2 includes an approved database GWS21. The data stored in approved database GWS21 is an address of IP server W obtained by an IP under contract with a mobile communication carrier to guarantee application reliability. When Gateway server GWS2 receives data from Internet INET, it extracts sender address of the data, and then searches for the same address in approved database GWS21.

For example, if explained with reference to FIG. 6, when gateway server GWS2 receives data D7, it extracts sender address from data D7 and determines whether the same address as the sender address is stored in approved database GWS21. If the same address as the sender address is stored in approved database GWS21 as a result of the determination, the gateway server executes a protocol conversion on the received data D7, and when transmitting it to mobile packet communications network MPN as data D8, an identifier indicating that that it is approved (hereafter, referred to as "approval identifier") is added to a header part of the packet.

If the same address as the sender address is not stored in approved database GWS21 as a result of the determination, gateway server GWS 2 executes a protocol conversion on the received data, and transmit them to mobile packet communications network MPN without adding an identifier.

CPU 11 of mobile phone MS that received data D8 determines whether an approval identifier is included in a header part of the data D8. When an approval identifier is added to data D8, CPU 11 operates so that download flag F, corresponding to the application, has a value of "0" and stores the flag in application control table TBL. When an approval identifier is not added to data D8, mobile phone MS operates so that the download flag F, corresponding to the application, has a value of "1" and stores the flag in application control table TBL.

Note that, with respect to an operation when an application is executed, because it is essentially the same as that described in the first embodiment, explanation (refer to FIG. 8) will be omitted.

Gateway server assures reliability of data received from the Internet as described above. Due to this system, a user of a mobile phone can recognize whether an application being executed is assured in reliability with ease and certainty. Additionally, IP can provide an application by collecting reliability from a user.

In the present embodiment, a pictogram ("DL" symbol) is displayed when the reliability of the application being executed on mobile phone MS is not assured. However, it is also possible to display a pictogram ("DL" symbol) when the reliability of the application being executed on mobile phone MS is assured.

[3] Modifications

An embodiment of the present invention may be a mode of producing and selling a mobile phone that displays a symbol on the basis of whether it is a download application or an installed application; or a mode of distributing through telecommunication lines programs that makes a terminal device realize the above function; or a mode of distributing such programs in a computer-readable storage medium.

The invention claimed is:

1. A terminal device comprising:
   a communication unit that obtains one or more applications from an external device;
   a memory that stores each of one or more applications in association with attribute data indicating whether the application was obtained by the communication unit;
   an instruction input unit that generates, in response to an input operation made by a user, an execution instruction to execute an application stored in the memory;
   a notification unit that provides to the user a notification indicating that an application under execution was obtained by the communication unit from an external device; and
   a processing unit that:
   (a) executes the application in accordance with the execution instruction generated by the instruction input unit,
   (b) determines, for the application subject to execution and on the execution of the application, whether the application was obtained by the communication unit on the basis of the attribute data stored in the memory in association with the application, and
   (c) controls the notification unit to provide to the user the notification at least partly during a time the application is under execution only when it was determined that the application is obtained by the communication unit.

2. The terminal device according to claim 1, wherein:
the communication unit obtains one or more applications from a data source in a network through the network.

3. The terminal device according to claim 1, wherein:
the communication unit obtains one or more applications from an external storage medium through the external device that reads out the one or more applications from the external storage medium.

4. The terminal device according to claim 1, wherein:
the one or more applications obtained by the communication unit are Java applications.

5. A terminal device comprising:
a communication unit that obtains one or more applications from an external device;
a memory that stores each of one or more applications in association with attribute data indicating whether the application was obtained by the communication unit;
an instruction input unit that generates, in response to an input operation made by a user, an execution instruction to execute an application stored in the memory;
a notification unit that provides to the user a notification indicating that an application under execution was not obtained by the communication unit from an external device; and
a processing unit that:
  (a) executes the application in accordance with the execution instruction generated by the instruction input unit,
  (b) determines, for the application subject to execution and on the execution of the application, whether the application was obtained by the communication unit on the basis of the attribute data stored in the memory in association with the application, and
  (c) controls the notification unit to provide to the user the notification at least partly during a time the application is under execution only when it was determined that the application is not obtained by the communication unit.

6. The terminal device according to claim 5, wherein:
the communication unit obtains one or more applications from a data source in a network through the network.

7. The terminal device according to claim 5, wherein:
the communication unit obtains one or more applications from an external storage medium through the external device that reads out the one or more applications from the external storage medium.

8. The terminal device according to claim 5, wherein:
the one or more applications obtained by the communication unit are Java applications.

9. A terminal device comprising:
a communication unit that obtains one or more applications from an external device;
a memory that has a first memory area in which one or more applications are stored before shipment of the terminal device and a second memory area in which one or more applications obtained by the communication unit are stored after the shipment of the terminal device;
an instruction input unit that generates, in response to an input operation made by a user, an execution instruction to execute an application stored in the memory;
a notification unit that provides to the user a notification indicating that an application under execution was obtained by the communication unit from an external device after the shipment of the terminal device; and
a processing unit that:
  (a) executes the application in accordance with the execution instruction generated by the instruction input unit,
  (b) determines, for the application subject to execution and upon execution of the application, whether the application is stored in the second memory area, and
  (c) controls the notification unit to provide to the user the notification at least partly during a time the application is under execution only when it is determined that the application is stored in the second memory area.

10. The terminal device according to claim 9, wherein:
the communication unit obtains one or more applications from a data source in a network through the network.

11. The terminal device according to claim 9, wherein:
the communication unit obtains one or more applications from an external storage medium through the external device that reads out the one or more applications from the external storage medium.

12. The terminal device according to claim 9, wherein:
the one or more applications obtained by the communication unit are Java applications.

13. A terminal device comprising:
a communication unit that obtains one or more applications from an external device;
a memory that has a first memory area in which one or more applications are stored before shipment of the terminal device and a second memory area in which one or more applications obtained by the communication unit are stored after the shipment of the terminal device;
an instruction input unit that generates, in response to an input operation made by a user, an execution instruction to execute an application stored in the memory;
a notification unit that provides to the user a notification indicating that an application under execution is stored in the memory before the shipment of the terminal device; and
a processing unit that:
  (a) executes the application in accordance with the execution instruction generated by the instruction input unit,
  (b) determines, for the application subject to execution and on the execution of the application, whether the application is stored in the first memory area, and
  (c) controls the notification unit to provide to the user the notification at least partly during a time the application is under execution only when it is determined that the application is stored in the first memory area.

14. The terminal device according to claim 13, wherein:
the communication unit obtains one or more applications from a data source in a network through the network.

15. The terminal device according to claim 13, wherein:
the communication unit obtains one or more applications from an external storage medium through the external device that reads out the one or more applications from the external storage medium.

16. The terminal device according to claim 13, wherein:
the one or more applications obtained by the communication unit are Java applications.

17. A terminal device comprising:
a communication unit that obtains one or more applications from an external device;
a memory that stores each of one or more applications obtained by the communication unit in association with attribute data indicating whether the application was obtained by the communication unit along with a reliability indicator indicating a degree of reliability of the application;

an instruction input unit that generates, in response to an input operation made by a user, an execution instruction to execute an application stored in the memory;

a notification unit that provides to the user a notification indicating that an application under execution does not have a certain degree of reliability; and a processing unit that:
  (a) determines, on reception of an application by the communication unit, whether the application is received along with the reliability indicator,
  (b) controls the memory to store the received application in association with the attribute data indicating a result of the determination on whether the application is received along with the reliability indicator,
  (c) executes the received application in accordance with the execution instruction generated by the instruction input unit,
  (d) determines, for the received application subject to execution and on the execution of the received application, whether the received application has the certain degree of reliability on the basis of the attribute data stored in the memory in association with the application, and
  (e) controls the notification unit to provide to the user the notification at least partly during a time the application is under execution only when it is determined that the application does not have the certain degree of reliability.

18. The terminal device according to claim 17, wherein:
the communication unit obtains one or more applications from a data source in a network through the network.

19. The terminal device according to claim 18, wherein:
the communication unit obtains one or more applications from an external storage medium through the external device that reads out the one or more applications from the external storage medium.

20. The terminal device according to claim 19, wherein:
the one or more applications obtained by the communication unit are Java applications.

21. A terminal device comprising:
a communication unit that obtains one or more applications from an external device;

a memory that stores each of one or more applications obtained by the communication unit in association with attribute data indicating whether the application was obtained by the communication unit along with a reliability indicator indicating a degree of reliability of the application;

an instruction input unit that generates, in response to an input operation made by a user, an execution instruction to execute an application stored in the memory;

a notification unit that provides to the user a notification indicating that an application under execution has a certain degree of reliability; and a processing unit that:
  (a) determines, on a reception of an application by the communication unit, whether the application is received along with the reliability indicator,
  (b) controls the memory to store the received application in association with the attribute data indicating a result of the determination on whether the application is received along with the reliability indicator,
  (c) executes the received application in accordance with the execution instruction generated by the instruction input unit,
  (d) determines, for the received application subject to execution and on the execution of the received application, whether the received application has the certain degree of reliability on the basis of the attribute data stored in the memory in association with the application, and
  (e) controls the notification unit to provide to the user notification at least partly during a time the application is under execution only when it is determined that the application has the certain degree of reliability.

22. The terminal device according to claim 21, wherein:
the communication unit obtains one or more applications from a data source in a network through the network.

23. The terminal device according to claim 21, wherein:
the communications unit obtains one or more applications from an external storage medium through the external device that reads out the one or more applications from the external storage medium.

24. The terminal device according to claim 21, wherein:
the one or more applications obtained by the communication unit are Java applications.

* * * * *